United States Patent [19]
Oberg

[11] 3,807,177
[45] Apr. 30, 1974

[54] FLOATING BOOM STRUCTURES

[75] Inventor: Per Olof Oberg, Nordmaling, Sweden

[73] Assignee: Sanera Projecting Aktiebolag, Nordmaling, Sweden

[22] Filed: Dec. 15, 1971

[21] Appl. No.: 208,313

[30] Foreign Application Priority Data
Oct. 15, 1971 Sweden.............................. 13108/71

[52] U.S. Cl. ................................................. 61/1 F
[51] Int. Cl. ............................................ E02b 15/04
[58] Field of Search ................................. 61/1 F, 5

[56] References Cited
UNITED STATES PATENTS

| | | | |
|---|---|---|---|
| 3,563,036 | 2/1971 | Smith et al. | 61/1 F |
| 3,701,259 | 10/1972 | Heartness | 61/1 F |
| 3,718,001 | 2/1973 | Harper | 61/1 F |
| 3,592,006 | 7/1971 | Crucet | 61/1 F |
| 3,499,290 | 3/1970 | Smith | 61/1 F |
| 3,592,007 | 7/1971 | Renner | 61/1 F |
| 3,613,377 | 10/1971 | Zaugg | 61/1 F |

FOREIGN PATENTS OR APPLICATIONS

| | | | |
|---|---|---|---|
| 77,350 | 1/1962 | France | 61/1 F |
| 317,928 | 11/1969 | Sweden | 61/1 F |

Primary Examiner—Mervin Stein
Assistant Examiner—David H. Corbin
Attorney, Agent, or Firm—Woodhams, Blanchard & Flynn

[57] ABSTRACT

A boom structure for collecting and screening off impurities located on an at the surface of contaminated water. The boom has a curtain of clothlike material depending substantially vertically in the water and supported by buoyant bodies and maintained in a substantially vertical position by weights attached preferably to the lower edge of the curtain. The buoyant bodies comprise hermetically sealed buoyant bags attached to one or both sides of the curtain and constructed of soft cloth material which is impermeable to liquid. The bags when not influenced by water pressure are flat and of substantially uniform thickness. The buoyant bags enclose a constant quantity of gas, preferably air, and are attached to the curtain such that the quantity of gas enclosed in each buoyant bag when subjected to water pressure as the boom is placed in the water can be freely pressed up towards an upper portion of the buoyant bag to create in said portion a balloon-like swelling.

12 Claims, 11 Drawing Figures

PATENTED APR 30 1974 3,807,177

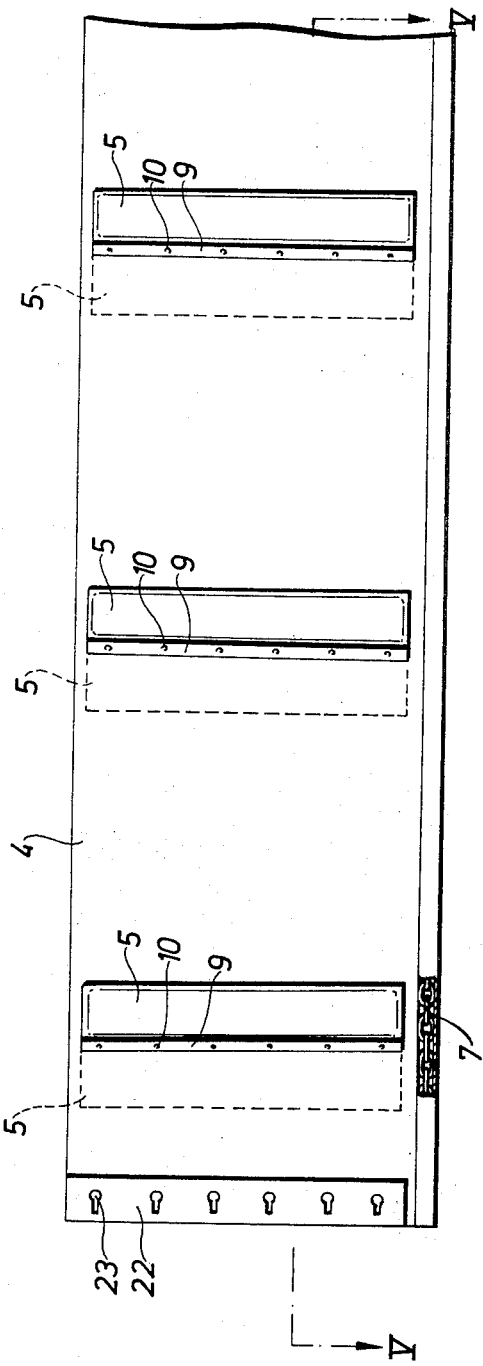

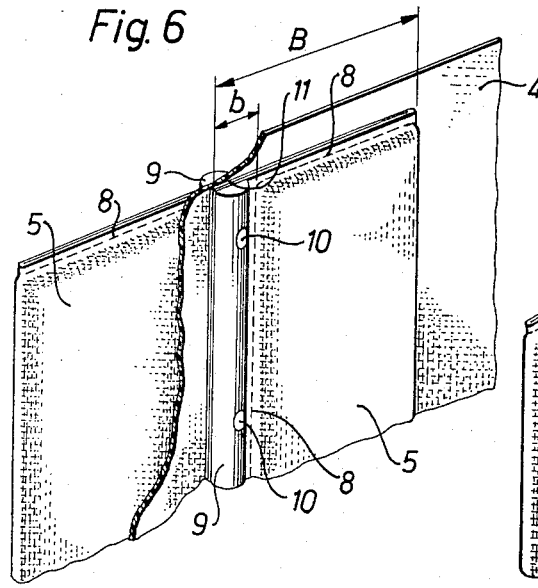
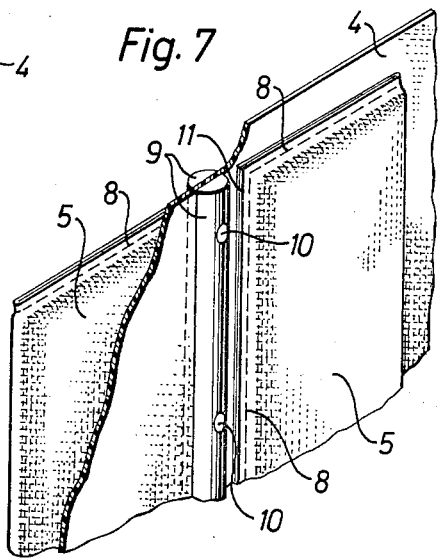
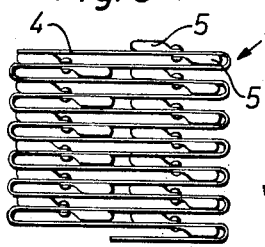
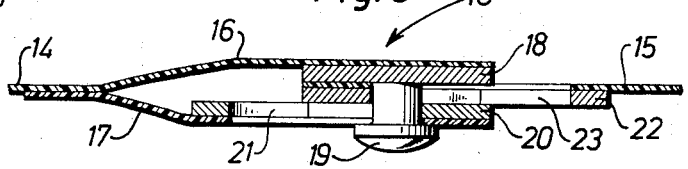
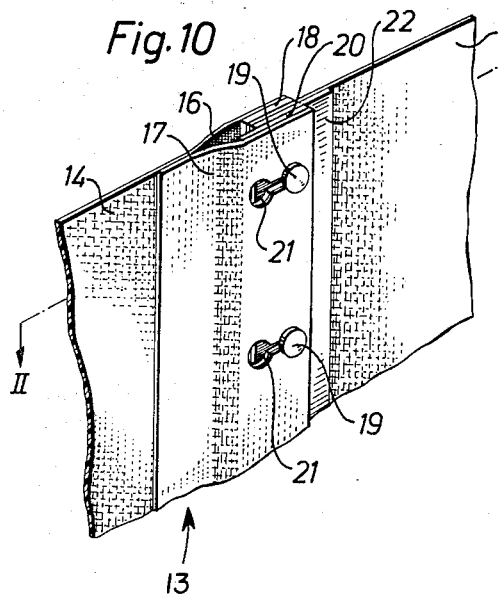
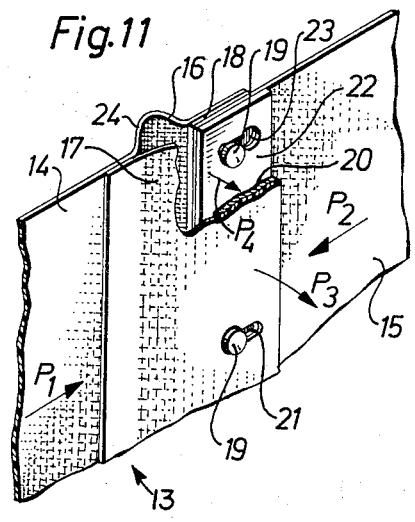

FLOATING BOOM STRUCTURES

The present invention refers to floating boom structures.

Floating boom structures have long been used for screening-off and collecting impurities floating on the surface of water. The boom of modern construction can be considered the simplest and most effective means for neutralizing and combating oil slicks covering wide areas of water. Normally extremely wide areas must be screened off and superintended. In this connection, it should be possible to couple together booms having a length of, for example, 25–30 meters, to form a continuous boom length of, e.g., 500 meters, the end of the boom structure then being attached to towing vessels which tow the boom across the contaminated area.

In addition to fulfilling its function as an efficient decontamination means, the modern boom must be each to handle, reliable in operation and inexpensive to manufacture. With respect to the handling of the boom structure the main requirements are that it should be possible to place the separate booms in position rapidly and that each boom can be positively coupled to adjacent booms to form an efficient boom structure, and that subsequent to using the boom structure it should be relatively easy to clean the individual boom units, disconnect them from each other and to fold them into the least possible volume for storage purposes. The reliability in operation of such boom structures primarily depends on the means which hold the structure buoyant in the water. A number of devices have been proposed in this respect, all of which are based on the provision of buoyant bodies which are inflated, or extended by spring means from a compressed position, in which the boom unit is folded or rolled to a deflated or non-extended condition when the boom is placed on the surface of the water. According to certain ones of the solutions proposed, the buoyant bodies are arranged to form the coherent, main portion of the boom structure, from which a screen or curtain having weights fastened to the end thereof is lowered to a suitable depth in the water. Constructions are also to be found in which the boom comprises a strip-like curtain which is connected to loose buoyant bodies prior to being lowered in the water.

The disadvantages with automatic boom constructions reside in the difficulty of obtaining sufficiently rapid inflation or expansion of the buoyant bodies, particularly when the boom structure is laid out from an aeroplane or a helicopter. In this respect, it is necessary that the buoyant bodies are capable of adopting fully automatically the larger, supporting volume required to keep the boom structure afloat immediately when the boom is placed in the sea. Furthermore, when the boom is rolled up or folded after use, it must be possible to compress the buoyant bodies to their smallest possible packing volume without necessitating the application of external means or influences. With buoyant bodies of present day construction this means that communication must be provided between the interior of the buoyant bodies and the ambient air. This in turn requires the insertion of special valve means on the top of the buoyant bodies, with the accompanying risk of water penetrating into the buoyant body and reducing its buoyancy, particularly in rough seas or heavy swells.

The present invention relates to a boom structure having an hermetically sealed buoyant body and completely lacking valves and expansion means. In accordance with the invention there is provided a particularly reliable boom structure which can be expanded or rolled up to low packing volumes and which can be made ready for use without manual operation.

Thus, the present invention relates to a boom structure for collecting and screening off impurities located on and at the surface of contaminated water, having a curtain of cloth-like material depending substantially vertically in the water and supported by buoyant bodies and maintained in a substantially vertical position by weights attached preferably to the lower edge of the curtain, the boom structure being mainly characterized in that the buoyant bodies comprise hermetically sealed buoyant bags of soft cloth material which is impermeable to liquid, for example woven fabric or the like impregnated with a rubber or plastics composition, the bags when not influenced by water pressure being flat and substantially of uniform thickness, and in that the buoyant bags enclose a constant quantity of gas, preferably air and are attached to the curtain in the manner such that the quantity of gas enclosed in each buoyant bag when subjected to water pressure as the boom is placed in the water can be freely pressed up towards an upper portion of the buoyant bags to create in said portion a balloon-like swelling so that each buoyant bag forms a buoyant body. The invention will now be described in more detail with reference to an embodiment thereof illustrated in the accompanying drawings.

FIG. 4 is a side view of the boom structure illustrated in FIG. 1, and FIG. 5 is a section of the boom structure taken through the lines V—V in FIG. 4.

FIGS. 6, 7 illustrate in perspective two alternative methods of attaching the buoyant bags to a boom curtain.

FIG. 8 illustrates diagrammatically in section a method of folding together a boom length in accordance with the invention to a small packing volume.

FIGS. 9, 10 and 11 illustrate in perspective and in section an arrangement for joining together two boom structures.

Figure 1:
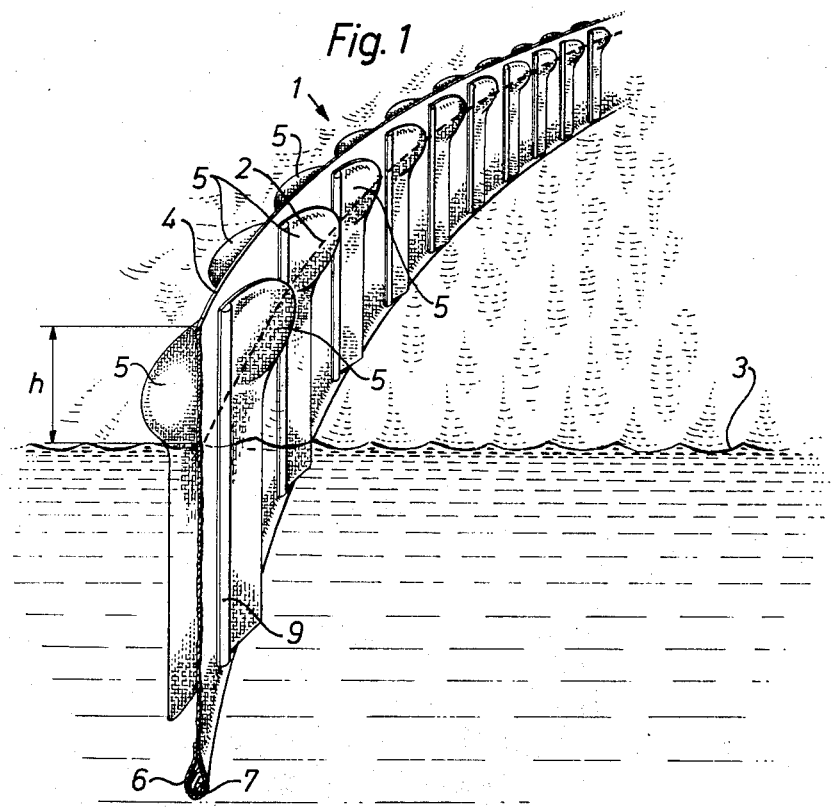
FIG. 1 illustrates in perspective a portion of a boom structure according to the invention floating in the sea.

FIG. 1 illustrates a portion of a boom structure, generally illustrated by the reference numeral 1, laid out in the water, a section surface being shown through the boom and the water by the level line 2 principly marked with the height of the boom structure in relation to the surface of the water 3. The boom structure includes a curtain 4 which is located substantially vertically in the water and on the sides of which buoyant bags 5 are arranged in substantially uniform spaced relationship. As will be apparent from the following, the buoyant bags 5 are hermetically sealed and are made of an air-tight and water-tight, substantially thin and soft cloth material, for example a fabric material or the like impregnated with a rubber of plastics composition and attached substantially perpendicular to the longitudinal direction of the boom 1. The boom curtain 4 also comprises a soft cloth material impermeable to water and oil, for example suitably a cloth, fabric or the like impregnated with a plastics or rubber composition and may be reinforced at the top by means of a folded seam or a glued or welded edge (not shown). The curtain is provided at the bottom thereof with a hem 6 in which the weights are placed, the weights preferably being in the form of a chain 7 intended to maintain the boom 1 in a substantially vertical attitude, FIGS. 1–4.

As previously mentioned, the buoyant bags of the present invention are in the form of a hermetically sealed chamber of substantially elongate, rectangular shape. These chambers are produced, for example by folding a length of material corresponding to a height H, FIG. 2, i.e. equal to the height of the buoyant bags, and a breadth equal to the double breadth B, FIG. 6 of the finished bags around a longitudinal centre line and by gluing or heat welding the material along superposed edges 8 to form an air-tight structure, FIGS. 6, 7. In accordance with the invention, when joining the edges of the buoyant bags it should be seen that a sufficiently large quantity of air is enclosed in each bag 5, so that the total supporting power afforded by all the bags located on a portion of a boom, FIG. 1, enables the boom to protrude above the surface of the water 3 to a height $h$ sufficient to effectively prevent oil trapped within the boom structure from washing from one side of the boom to the other. Practical experience has shown that a suitable volume of air enclosed in each buoyant body at atmospheric pressure is approximately 1.5 dm$^3$.

In a free state, i.e., when not subjected to the pressure of the water, each buoyant bag 5 forms a substantially rectangular air cushion of uniform thickness. Such an air cushion is illustrated in section in FIG. 5 and in vertical projection in FIG. 2. The buoyant bags are suitably attached in pairs to the boom curtain 4 with one bag in each pair located on either side of the curtain, FIG. 5. The distance between each pair of buoyant bags may be approximately equal to the height of the curtain 4, i.e., in practice approximately 1 meter. To provide for a certain degree of rigidity of the curtain 4 in a vertical position, substantially vertically extending pairs of stiffening ribs 9 made of aluminum for example and having a semi-cylindrical shape are arranged in the longitudinal direction of the curtain with the same spacing as the pairs of buoyant bags, the stiffening ribs 9 being arranged opposite each other on either side of the curtain 4 and attached to the curtain and held together preferably by means of through passing rivets 10.

The buoyant bags 5, which have been premanufactured by folding the bag material and sealing the edges thereof in the afore-described manner, are attached along one pair of stiffening ribs 9, as shown in FIG. 6. As will be seen from the drawings, the buoyant bags are provided with an attachment strip 11 of breadth $b$, (FIG. 6) which is sufficient to enable this strip to be placed beneath the pair of stiffening ribs 9 and joined thereto and to the curtain 4 by means of the rivets passing through the curtain and the ribs 9, thereby forming a durable joint which can be further reinforced by applying an adhesive or the like thereto.

FIGS. 4 and 5 illustrate a portion of a boom structure having three pairs of buoyant bags 5 and stiffening ribs 9 joined together in the manner illustrated in FIG. 6. Since the buoyant bags 5 are thus only secured along one edge, they are able to swing with a certain amount of freedom along the edge and outwardly from the boom curtain, but because of their design and inherent rigidity the bags will lie substantially along the respective sides of the boom curtain when not subjected to water pressure, as illustrated in FIGS. 2 and 5.

FIG. 7 illustrates an embodiment provided with a narrow attachment strip 11' intended to be welded directly to the curtain 4.

Figure 2:
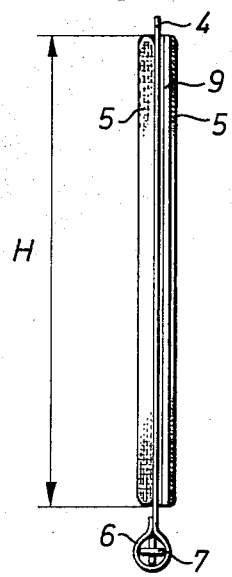
FIG. 2 illustrates a section of the boom structure shown in FIG. 1, two buoyant bags being shown in the condition adopted thereby when not subjected to lateral forces from the water.
Figure 3:
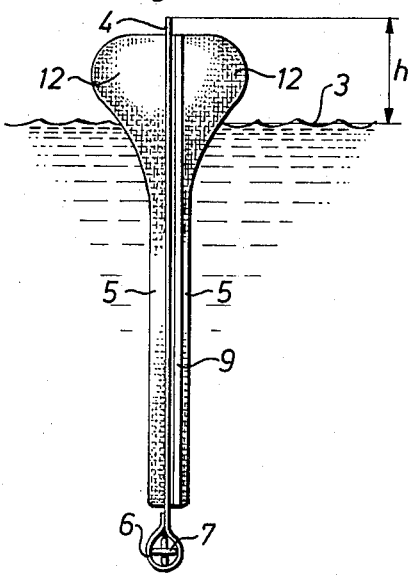
FIG. 3 illustrates a section of the boom structure corresponding to FIG. 2, the boom structure being submersed in the sea and the buoyant bags illustrated in FIG. 2 being subjected to lateral pressure from the water.

When laying the boom structure out in the water to be decontaminated the boom structure will rapidly adopt the vertical position illustrated in FIG. 3 irrespective of its initial attitude in the water, owing to the weight acting on the curtain from the chain 7. As a result of the pressure exerted on the bags by the water, the lower portions of the bags 5 will be compressed and completely flattened, with the air present in these portions of the bags rising and causing the upper portion of the bags to swell, as shown at 12. The swollen portions 12 will thus contain, under a certain water pressure, all the air which was previously uniformly contained in the buoyant bags 5 when not subjected to pressure, FIG. 2. Thus, as a result of the pressure exerted thereon by the water, the air in buoyant bags 5 will be automatically distributed in the manner required to hold the boom structure 1 in a substantially vertical attitude.

When the boom structure is removed from the water, the pressure is relieved from the boom and the buoyant bags return to their condition of uniform thickness, as shown in FIGS. 2 and 5, thereby enabling the boom to be rolled or folded into a small packing volume. FIG. 8 illustrates diagrammatically a portion of a folded boom, the Figure showing the special manner in which folding of the boom can be effected to prevent the bags 5 of uniform thickness from colliding with each other in a manner to reduce the packaging volume.

As mentioned in the aforegoing, a boom length must be capable of being folded simply and rapidly, and the coupling joint must, as far as possible, be impermeable to oil. The coupling joint should also be sufficiently strong to resist the loads to which a long boom chain can be subjected as a result of towing forces, wind and wave pressure and the like. Furthermore, in certain instances the boom structure should be given a certain degree of shape-retaining rigidity at the region where separate booms are joined together, since no buoyant bodies are located in this region. FIGS. 9–11 illustrate a coupling means generally shown by the reference numeral 13, which fulfills these requirements. FIG. 9 is a sectional view taken through the line II—II in FIG. 10 and illustrates a coupling end 14 of a boom length which is connected with a coupling end 15 of another boom length. The coupling end 14 has two portions 16, 17, of which portion 16 is a direct continuation of a beam curtain 4 and the portion 17 comprises a strip which is suitably made of the same material as the curtain 4 and attached to the coupling end 14 by an adhesive or heat welding. Attached to the portion 16 perpendicular to the longitudinal direction of the boom is a rail 18 having buttons 19 arranged thereon in uniform spaced relationship. In a corresponding manner, a rail 20 is arranged on the portion 17 with keyhole shaped buttonholes 21 evenly spaced therealong, corresponding to the position of the buttons 19.

Arranged on the coupling end 15, which comprises a portion of a boom curtain, is a rail 22 provided with keyhole-shaped buttonholes 23, FIG. 11, having the same spacing as the buttonholes 21 and rotated through 180° in relation thereto. The rails 18, 20 and 21 may suitably be made of a plastics material or the like and attached to the portions 16, 17 and to the coupling end 15 by an adhesive, heat welding or the like.

FIGS. 9, 10 illustrate the coupling arrangement when assembled, the two coupling ends 14, 15 being connected to each other. When disconnecting the arrangement, the coupling ends 14, 15 are pushed towards each other in the direction of arrows P1 and P2, FIG. 11, an outwardly projecting fold 24 forming on the portion 16 while the portion 17 is simultaneously moved to an extent whereby a flared portion of the buttonholes 21 registers beneath the buttons 19. The portion 17 can then be swung out in the direction shown by the arrow P3, FIG. 11, away from the buttons 19. In a similar manner, the coupling end 15 is moved relative to the portion 16 in a manner whereby a flared portion of the buttonhole 23 registers with the buttons 19, whereafter the coupling end 15 can be freed from the buttons 19 by moving said portion in the direction of the arrow P4. This sequence of operations is reversed when wishing to connect the two portions together.

The boom structure of the present invention is extremely simple with respect to construction and design. Owing to the hermetically sealed buoyant bags, all valve means and means for inflating or expanding the buoyant bags serving as the buoyant bodies are completely obviated. This provides a more reliable apparatus in operation and lowers the costs of maintaining the boom structure. No preparatory measures whatsoever need be taken for attaching buoyant bodies to the boom when laying the boom out in the water, and it is possible to roll or fold the boom into a small packing volume. Moreover, the boom is particularly cheap to manufacture, owing to the simplicity of its construction.

What is claimed is:

1. A boom structure for collecting and screening of impurities located on and at the surface of contaminated water, comprising an elongated substantially continuous sheetlike curtain constructed of a material which is substantially impermeable to liquid, a plurality of buoyant bodies disposed adjacent at least one side of said curtain and means for fixedly attaching each of said bodies to said continuous sheetlike curtain at substantially uniformly spaced intervals longitudinally therealong, each of said buoyant bodies comprising wall means defining a hermetically sealed bag of flexible material which is impermeable to liquid and which contains trapped therein a predetermined quantity of a gas so that each said bag is substantially flat and of substantially uniform thickness when disposed in the atmosphere but is deformable when subjected to water pressure so that the gas in each bag is pressed upwardly into the upper portion of the bag to create a balloonlike swelling, each said bag being oblong in shape and affixed to said curtain so that the elongated direction of the bag extends substantially perpendicular to the longitudinal direction of said curtain, and weight means associated with the lower portion of said curtain for maintaining same in an appropriate screening position when in the water.

2. A boom structure according to claim 1, wherein a first plurality of said sealed bags are disposed adjacent one side of said curtain and are fixedly secured to said curtain at substantially uniformly spaced intervals along the longitudinally extending direction of said curtain, and wherein a second plurality of said sealed bags are disposed adjacent the other side of said curtain and are fixedly secured to said curtain at substantially uniformly spaced intervals along the longitudinally extending direction thereof, the bags as fixedly secured to one side of said curtain being spaced from one another, and the bags are fixedly secured to the other side of said curtain also being spaced from one another and being located directly opposite the spaces which are provided between the bags disposed adjacent said one side of said curtain.

3. A boom structure according to claim 1, wherein said bags have a width extending in the longitudinal direction of said curtain which is only a small fraction of the length of the bags, said bags each having a vertically extending longitudinal edge disposed directly adjacent said one side of said curtain and extending substantially perpendicular to the elongated direction of said curtain, and said means for fixedly attaching each of said bags to said curtain including an elongated stiffening member fixedly attaching said one longitudinally extending edge of said bag to said curtain, the remainder of said bag being free of attachment to said curtain.

4. A boom structure according to claim 1, wherein said bags each have an edge surface thereof extending substantially perpendicular to the longitudinal direction of said curtain, and elongated stiffening rib means disposed adjacent each of said edge surfaces for fixedly securing each of said bags to said curtain.

5. A boom structure for collecting and screening off impurities located on and at the surface of contaminated water, comprising an elongated curtain of clothlike material, a plurality of buoyant bodies fixed to said curtain along at least one side thereof, the buoyant bodies each comprising wall means forming a hermetically sealed bag of soft flexible material which is impermeable to liquid and defines therein a closed compartment containing therein a constant quantity of gas, the bags when not influenced by water pressure being flat and substantially of uniform thickness, the bags having a vertically elongated portion thereof attached to the curtain such that the quantity of gas enclosed in each buoyant bag when subjected to water pressure is freely pressed up towards an upper portion of the bag to create in said portion a balloon-like swelling so that each bag forms a buoyant body, a plurality of pairs of transverse stiffening ribs fixedly secured to said curtain, the ribs of each pair being disposed directly adjacent one another and disposed on opposite sides of said curtain, said pairs of ribs being substantially uniformly laterally spaced from one another in the longitudinal direction of said curtain, the ribs of each pair extending in a direction substantially perpendicularly to the longitudinal direction of said curtain, and said curtain being provided with weights thereon for keeping same in an appropriate screening position in water.

6. A boom structure according to claim 5, wherein said bags are oblong in shape, each said bag including a longitudinally extending edge fixedly attached between said curtain and one of said stiffening ribs, said bags being positioned on both sides of said curtain so that each rib of each pair is used for attaching one of said bags to said curtain, each pair of stiffening ribs securing a pair of said bags to the curtain so that said bags are located on opposite sides of the curtain and positioned such that they lie in a right hand and a left hand position relative to each other to facilitate folding and rolling of the boom structure for packing purposes.

7. A boom structure according to claim 5, wherein each of said bags comprises a vertically elongated, substantially rectangularly shaped sealed cushion containing trapped therein a predetermined quantity of a gas, said bags having vertically extending longitudinal edges with said bags being disposed adjacent one side of said curtain so that one of the vertically extending longitudinal edges of said bag is disposed directly adjacent said one side of said curtain and extends substantially perpendicular to the elongated direction of said curtain, and means for attaching said one longitudinally extending edge of said bag to said curtain, the remainder of said bag being free of attachment to said curtain.

8. A boom structure according to claim 5, wherein said curtain comprises an elongated substantially continuous sheet of material which is impermeable to liquid, and said plurality of sealed bags including a first plurality of bags positioned adjacent one side of said curtain and fixedly secured to said curtain at substantially uniform intervals therealong and a second plurality of bags disposed adjacent the other side of said curtain and fixedly secured thereto at substantially uniformly spaced intervals therealong, each of said bags comprising a separate sealed body having trapped therein a predetermined quantity of a gas.

9. A boom structure according to claim 8, wherein said bags are oblong in shape and are affixed to said curtain so that the elongated direction thereof extends substantially perpendicular to the longitudinal direction of said curtain, said bags having a width extending in the longitudinal direction of said curtain which is only a small fraction of the length of the bags.

10. A boom structure for collecting and screening off impurities located on and at the surface of contaminated water, comprising an elongated curtain of clothlike material, a plurality of buoyant bodies fixed to said curtain along at least one side thereof, the buoyant bodies each comprising wall means forming a hermetically sealed bag of soft flexible material which is impermeable to liquid and defines therein a closed compartment containing therein a constant quantity of gas, the bags when not influenced by water pressure being flat and substantially of uniform thickness, the bags having a vertically elongated portion thereof attached to the curtain such that the quantity of gas enclosed in each buoyant bag when subjected to water pressure is freely pressed up towards an upper portion of the bag to create in said portion a balloon-like swelling so that each bag forms a buoyant body, said curtain being provided with weights thereon for keeping the same in an appropriate screening position in water, and coupling means comprising first and second coupling portions formed on the opposite end portions of said boom for permitting said end portions to be fixedly connected together, said first and second coupling portions including means for stiffening the end portions of said boom, said first coupling portion including a pair of flaplike portions formed on the end of said curtain with one of said flaplike portions having buttonlike means projecting therefrom and the other flaplike portion having a first keyhole-shaped opening formed therein corresponding to said buttonlike means, and said second coupling portion also including a second keyhole-shaped opening formed therein and disposed for alignment with said buttonlike means when the opposite end portions are disposed so as to overlap, said second keyhole-shaped opening being angularly displaced 180° relative to said first keyhole-shaped opening.

11. A boom structure according to claim 10, wherein the stiffening means associated with the first coupling portion includes a thin and relatively stiff rail of plastics material, said buttonlike means being integrally attached to said rail.

12. A boom structure according to claim 11, wherein said other flaplike portion includes a thin relatively rigid rail of plastics material having said first buttonhole-shaped opening formed therein, and wherein said second coupling portion includes a thin relatively rigid rail of plastics material secured to the other end of said curtain and having said second keyhole-shaped opening formed therein.

* * * * *